United States Patent Office 3,249,396
Patented May 3, 1966

3,249,396
PRODUCTION OF PHOSPHONITRILIC
FLUORIDES
Lars Gunnar Lund, Oldbury, and Anthony F. Childs,
Kinver, England, assignors to Albright & Wilson (Mfg.)
Limited, Oldbury, England, a British company
No Drawing. Filed May 23, 1961, Ser. No. 111,929
Claims priority, application Great Britain, May 27, 1960,
18,749/60
11 Claims. (Cl. 23—14)

This invention relates to an improved process for the production of phosphonitrilic fluorides from phosphonitrilic chlorides. The term "phosphonitrilic chlorides" is understood to include a mixture of linear compounds of empirical formula $(PNCl_2)_mPCl_5$ where $m$ is an integer and/or cyclic compounds of general formula $(PNCl_2)_n$ where $n$ is an integer greater than two, as well as any of the individual compounds of either series.

It is well known that so far no success has been achieved from attempts to prepare phosphonitrilic fluorides of general formula $(PNF_2)_n$ where $n$ is an integer greater than two by a process analogous to the normal process of preparing the phosphonitrilic chlorides (c.f. H. N. Stokes, Am. Chem. J., 19 732 (1897) and R. Schenck and G. Römer, Berichte 57B, 1343 (1924). Consequently the phosphonitrilic fluorides have usually been prepared by fluorination of the corresponding phosphonitrilic chlorides.

Several methods of fluorination of the phosphonitrilic chlorides have been employed with varying degress of success. H. Bode (Angew. Chem. A60, 67 (1948)) has shown that the use of anhydrous hydrogen fluoride yields only ammonium hexafluorophosphate, and O. Schmitz-Dumont and H. Kulkens (Ziet. anorg. allg. Chem. 238, 189 (1938)) have shown that zinc fluoride fails to react and silver fluoride produces only poor yields of phosphonitrilic fluoride. A more successful fluorination has been achieved using anhydrous plumbous fluoride (O. Schmitz-Dumont and H. Kulkens, Z. anorg. allg. Chem. 238, 189 (1938); O. Schmitz-Dumont and A. Braschos, Z. anorg. allg. Chem. 243, 113 (1939), and O. Schmitz-Dumont and M. Walther, Z. anorg. allg. Chem. 298, 193 (1959)) which yields both fully fluorinated and partially fluorinated products.

A still more successful fluorination of phosphonitrilic chlorides has been achieved using potassium fluosulphinate either under dry conditions (F. Seel and J. Langer, Angew. Chem. 68, 461 (1956)) or in nitrobenzene (F. Seel and J. Langer, Z. anorg. allg. Chem. 295, 316, (1958)). The preparation of potassium fluosulphinate is described in German Patent No. 1,000,354 by F. Seel and its use as a fluorination agent in German Patent No. 1,000,355.

In our copending application No. 33057/58, now British Patent 895,969, it is shown that fluorination of trimeric, tetrameric and higher phosphonitrilic chlorides is possible using potassium fluoride and less than the stoichiometric amount of sulphur dioxide by reacting the potassium fluoride, sulphur dioxide and phosphonitrilic chloride together under pressure. This method has the advantage that it eliminates the intermediate preparation of potassium fluosulphinate. This reaction is also shown by C. P. Haber and R. K. Uenishi (of Ind. Eng. Chem., Chem. Eng. Data Series 3, 323 (1958)) to yield trimeric and tetrameric phosphonitrilic fluorides from the corresponding phosphonitrilic chlorides.

T. J. Mao, R. D. Dresdner and J. A. Young (J. Am. Chem. Soc. 81, 1020 (1959)) have also shown that trimeric phosphonitrilic fluorides may be prepared by reacting phosphorus nitride $(P_3N_5)$ with fluoromethane sulphur pentafluoride $(CF_3SF_5)$ or nitrogen trifluoride $(NF_3)$.

We have now found that phosphonitrilic chlorides can be successfully converted into the corresponding phosphonitrilic fluorides by reaction with an alkali metal silicofluoride or a mixture thereof with a catalyst.

This invention therefore provides a method of fluorination of phosphonitrilic chlorides which involves the use of an inexpensive and readily available fluorinating agent and thus eliminates the prior preparation of intermediates for fluorination. The process of the invention also has the advantage that it allows rapid reaction at atmospheric pressure. The process has the further advantage that the silicon tetrafluoride formed may be reconverted to sodium silicofluoride and return to the reaction system. The reaction with sodium silicofluoride can be represented as follows:

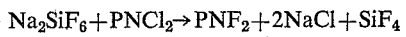

$$Na_2SiF_6 + PNCl_2 \rightarrow PNF_2 + 2NaCl + SiF_4$$

According to the present invention, there is provided a process for producing phosphonitrilic fluorides which comprises heating a phosphonitrilic chloride with an alkali metal silicofluoride with or without the presence of a catalyst.

Suitable additives for use as catalysts in the process of the invention are lead silicofluoride, sodium fluoride, lead fluoride, and metallic copper.

If desired, sodium fluoride may be used in the reaction. It may act simply as a catalyst or take part in the reaction. In the latter case a reduced quantity of sodium silicofluoride is required initially since the latter is formed in situ according to the following equations:

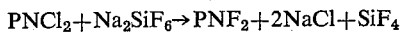
$$PNCl_2 + Na_2SiF_6 \rightarrow PNF_2 + 2NaCl + SiF_4$$
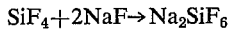
$$SiF_4 + 2NaF \rightarrow Na_2SiF_6$$

As stated above both linear and cyclic phosphonitrilic chlorides react according to the invention. The linear compounds react much more easily than the cyclic compounds and yield a mixture of cyclic and linear fluorides as well as some phosphorus fluorides. The cyclic compounds react to give cyclic phosphonitrilic fluorides.

In general, the phosphonitrilic chlorides are intimately mixed with an equivalent amount or slight excess (about 10%) of alkali metal silicofluoride with or without the addition of a catalyst. The mixture is heated in the reaction vessel to a temperature which need not exceed 450° C. and is preferably between 250° and 350° C. As reaction proceeds the phosphonitrilic fluorides distil over, are condensed and collected in a receiver. Yields are usually of the order of 80 to 90%. The silicon tetra fluoride formed, after passing through the condenser, is passed into water to form silicofluoric acid and hydrated silica. The silicofluoric acid can then be precipitated by means of a sodium salt to give sodium silicofluoride.

The phosphonitrilic fluorides are more volatile than the corresponding chlorides and are useful as chemical intermediates, insecticides and nematocides.

The following examples serve to illustrate the invention:

*Example 1*

40.34 gms. (0.348 mole) of a mixture of phosphonitrilic chlorides of general formula $(PNCl_2)_n$ where $n$ is an integer greater than two and with an average molecular weight of approximately 800 were heated with 70 gms. (0.373 mole) of sodium silicofluoride at temperatures from 280° to 345° C. The reaction was complete in 2 hours 15 mins. During the last 40 minutes a slow stream of nitrogen was passed through the reactor. The phophonitrilic fluorides either distilled or were carried over by the nitrogen and were condensed outside the reactor. A yield of 24.4 gms. (84.5%) of mixed phosphonitrilic fluorides was obtained. The silicon tetrafluoride was passed into water, separated from $SiO_2$ aq. and the solution was stored as aqueous silicofluoric acid.

*Example 2*

39.78 gms. (0.343 mole) of a mixture of phosphonitrilic chlorides of general formula $(PNCl_2)_n$ where $n$ is an integer greater than two and with an average molecular weight of approx. 800 were heated with 52.5 gms. (0.279 mole) of sodium silicofluoride and 17.5 gms. (0.071 mole) of plumbous fluoride under the conditions given in Example 1. The time of the reaction was reduced to 1 hour 45 minutes. A yield of 25.39 gms. (89.4%) of a mixture of phosphonitrilic fluorides was obtained.

*Example 3*

55 gms. (approx. 0.47 mole) of crude linear phosphonitrilic chlorides (petrol insoluble) of degree of polymerisation corresponding to the formula $(PNCl_2)_{8-10}PCl_5$ were reacted with 100 gms. (0.532 mole) of sodium silicofluoride. The reaction was complete in 90 minutes. 25 gms. (63.5%) of phosphonitrilic fluorides were obtained.

*Example 4*

153.5 gms. (1.32 moles) of a mixture of phosphonitrilic chlorides as used in Example 1 were heated with 286.5 gms. (1.52 moles) of sodium silicofluoride and 14 gms. of copper powder under the conditions given in Example 1. The time of reaction was 1 hour 50 minutes. A yield of 99.2 gms. (89.9%) of a mixture of phosphonitrilic fluorides was obtained.

*Example 5*

1000 gms. (8.62 moles) of a mixture of phosphonitrilic chlorides as used in Example 1 were heated in a reactor with 1750 gms. (9.31 moles) of sodium silicofluoride and 82 gms. (1.95 moles) of sodium fluoride. The total time of reaction was 4¾ hours. A yield of 524 gms. (73.2%) of mixed phosphonitrilic fluorides were obtained.

What we claim is:

1. The process for the production of phosphonitrilic fluorides which comprises heating at least one phosphonitrilic chloride selected from the group consisting of compounds having the formula $(PNCl_2)_mPCl_5$, $(PNCl_2)_n$, and mixtures thereof, wherein $m$ is an integer of at least 2 and $n$ is an integer greater than 2, with an alkali metal silicofluoride, at a temperature between 250° and 450° C.

2. The process of claim 1 which is carried out at a temperature between 250° and 350° C.

3. The process of claim 1 wherein the alkali metal silicofluoride is sodium silicofluoride.

4. The process of claim 1 wherein a mixture of phosphonitrilic chlorides are heated with the alkali metal silicofluoride.

5. The process of claim 1 which is carried out in the presence of a catalyst selected from the group consisting of lead silicofluoride, sodium fluoride, lead fluoride and metallic copper.

6. The process of claim 1 wherein the phosphonitrilic chloride reactant is selected from the group of compounds having the formula $(PNCl_2)_mPCl_5$ wherein $m$ is an integer of at least 2.

7. The process of claim 1 wherein the phosphonitrilic chloride reactant is selected from the group of compounds having the formula $(PNCl_2)_n$.

8. The process of claim 7 wherein the phosphonitrilic chlorides have an average molecular weight of about 800.

9. The process of claim 7 wherein $n$ is an integer from 8 to 10.

10. The process for the production of phosphonitrilic fluorides which comprises heating at least one phosphonitrilic chloride selected from the group consisting of compounds having the formula $(PNCl_2)_mPCl_5$, and $(PNCl_2)_n$ wherein $m$ is an integer of at least 2 and $n$ is an integer greater than 2, with an alkali metal silicofluoride, and sodium fluoride, at a temperature between 250° and 450° C., said sodium fluoride being present in greater than catalytic amount so that the combined molar amount of alkali metal silicofluoride present at the beginning of the reaction and the sodium silicofluoride formed in situ by the reaction of sodium fluoride with the silicofluoride by-product of the fluorination of phosphonitrilic fluoride compound is in stoichiometric excess over the amount of phophonitrilic chloride starting material.

11. The process of claim 10 wherein the alkali metal silicofluoride is sodium silicofluoride.

References Cited by the Examiner

UNITED STATES PATENTS

| | | | |
|---|---|---|---|
| 2,933,374 | 4/1960 | Cook et al. | 23—204 |
| 2,935,531 | 5/1960 | Dahmlos | 260—653.8 X |
| 2,980,495 | 4/1961 | Ratz et al. | 23—14 |

OTHER REFERENCES

Booth et al., J.A.C.S., vol. 65, pp. 1834–35 (1943).

Paddock et al., Advances in Inorganic Chemistry and Radiochemistry, vol. 1, pp. 347–383 (p. 350 especially relied on), 1953.

OSCAR R. VERTIZ, *Primary Examiner.*

MAURICE A. BRINDISI, *Examiner.*

M. N. MELLER, M. WEISSMAN, *Assistant Examiners.*